United States Patent Office 3,553,267
Patented Jan. 5, 1971

3,553,267
3-DIMETHYLAMINO-1,2,3,4-TETRAHYDROFLUORENE
Frederick Edmund Ward, Elkhart, Ind., assignor to Miles Laboratories, Inc., Elkhart, Ind., a corporation of Indiana
No Drawing. Filed Mar. 11, 1968, Ser. No. 711,914
Int. Cl. C07c 87/64
U.S. Cl. 260—576
1 Claim

ABSTRACT OF THE DISCLOSURE

A series of 3-amino-1,2,3,4-tetrahydrofluorenes that are useful as analgesic agents. These compounds are prepared by reacting a 1,9a-dihydrofluorene-3(2H)-one with a suitable secondary amine and reducing the resulting intermediate.

---

This invention relates to a novel series of chemical compounds having beneficial properties. More particularly, this invention relates to a new series of 3-amino-1,2,3,4-tetrahydrofluorenes that are useful as analgesic agents and to a novel process for the preparation thereof.

The novel compounds of this invention may be represented by the structural formula:

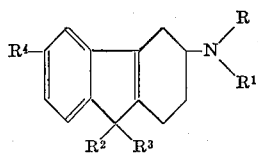

in which R and $R^1$ are lower alkyls, which may be the same or different, $R^2$ is hydrogen, $R^3$ is a member selected from the group consisting of hydrogen, lower alkyl, aralkyl and acyl or $R^2$ and $R^3$ when taken together are

$=\underset{H}{\overset{|}{C}}-Ar$ in which Ar is a member selected from the group consisting of phenyl and 4-halophenyl, and $R^4$ is a member selected from the group consisting of hydrogen, alkoxy, and hydroxy. Preferred compounds of the invention comprise 3-disubstituted amino-1,2,3,4-tetrahydrofluorenes in which the nitrogen atom is substituted with lower alkyl radicals having a chain length of between about 1 and 4 carbon atoms.

The novel compounds of the invention may be prepared by reacting a suitable 1,9a-dihydrofluorene-3(2H)-one with a suitable secondary amine. Advantageously, the 1,9a-dihydrofluorene - 3(2H)-one is substituted in the 6 or 9 position with radicals corresponding to those desired in the final compound. This reaction is beneficially carried out in the presence of a Lewis acid catalyst such as titanium tetrachloride. With the preferred catalyst titanium tetrachloride, the reactants, in a suitable solvent, are advantageously stirred at room temperature (about 23° C.) for an extended period of time, such as a matter of days, to obtain a desirable yield of an intermediate 3-substituted amino-1,2-dihydrofluorene.

The intermediate may then be selectively reduced to form the desired 3-substituted amona-1,2,3,4-tetrahydrofluorene. This reduction may be performed according to accepted chemical practices and is preferably carried out using a reducing agent such as sodium borohydride, lithium borohydride or potassium borohydride in a suitable solvent.

The preparation of these compounds may be represented by the chemical equations:

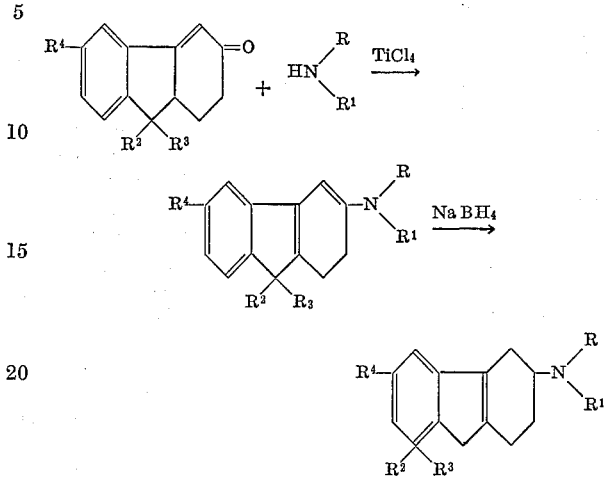

In this chemical equation the symbols represent the same radicals as previously described.

The novel compounds of this invention may be isolated as free bases and are preferably furnished as acid addition salts. Beneficially, pharmacologically acceptable salts are provided which are suitable for incorporation into medications. Satisfactory montoxic acid addition salts may be formed from mineral aicds such as halogen acids or sulfuric acid, or from organic acids such as citric acid, maleic acid, oxalic acid and other similar acids. The preparation of these addition salts is described in a subsequent detailed example and will not, therefore, be set forth at this point.

The compounds of this invention have beneficial pharmacological properties. In particular, these compounds produce analgesia in mammals.

Medications may be prepared including at least one of the novel compounds of this invention as an active ingredient in the form of the free base or pharmacologically acceptable acid addition salt thereof. These medications may be conveniently prepared by combining the active ingredient with a pharmaceutical vehicle including components selected from the fillers, carriers, extenders, excipients, and the like, generally used in pharmaceutical formulations. Medications may be prepared in the solid state as tablets or capsules, or in the liquid state as suspensions. Similar dosage forms suitable for oral, subcutaneous, intraperitoneal, or other convenient means of administration can also be provided. The pharmaceutical vehicle may also include common diluents or tableting adjuncts such as cellulose powder, cornstarch, lactose, talc and such, used according to accepted pharmaceutical manufacturing practices. Unit dosages (a specific weight, such as mg. or g.) of active ingredient in the medication may be varied so that an adequate amount is present to provide a desired therapeutic dose without untoward side effects, as well as to permit satisfactory variation in doses administered. A dose is considered as a ratio of the weight of active ingredient administered to a patient's body weight, usually expressed as mg./kg.

This invention will be further understood by reference to the following examples which are provided as illustrations and are not intended to be construed as limitations upon the invention, which invention is properly defined in the claims appended hereto.

EXAMPLE 1

3-dimethylamino-1,2,3,4-tetrahydrofluorene

3-dimethylamino-1,2-dihydrofluorene

A mixture of 1,9a-dihydrofluorene-3(2H)-one (42.2 g.) and dimethylamine (7.3 g.) in 500 ml. of dry ether was placed in a three neck reaction flask. The system was maintained under nitrogen. To the mixture was added $TiCl_4$ (19.5 g.) dropwise in 300 ml. of benzene at 0–10° C. The mixture was then stirred at room temperature (about 23° C.) for 2 days. A solid complex formed which was removed by filtration, and the filtrate concentrated to dryness in vacuo to yield 36 g. of a dark oil. An infrared spectrum ($CHCl_3$) showed no α,β-unsaturated ketone (C=O) absorption at 1650 cm.$^{-1}$. The N.M.R. spectrum ($CDCl_3$) showed a vinylic proton at τ4.80 P.P.M.

3-dimethylamino-1,2,3,4-tetrahydrofluorene maleate

To a stirred solution of crude 3-dimethylamino-1,2-dihydrofluorene (36 g.) in methanol was added in small portions $NaBH_4$ (10.7 g.). The mixture was stirred under reflux for one hour, then was allowed to stir at room temperature (about 23° C.) for 2 days. The solvent was removed in vacuo and the solid residue stirred with 10% NaOH solution (200 ml.). The organic material was extracted with ether. The ether extract was dried over $Na_2CO_3$, clarified with charcoal, and filtered. The filtrate was treated with maleic acid (36 g.) in acetone and the salt precipitated as an oil which solidified on standing. The mixture was placed in the cold overnight. The solid was collected by filtration. The filtrate was concentrated to dryness in vacuo and the residue was stirred with anhydrous ether. A semi-solid was obtained which was recrystallized from an acetone-ether mixture to yield 3 g. This was combined with the solid previously obtained and recrystallized from acetone-ether. Yield 22.3 g., M.P. 156–158° C.

*Analysis*—Calc'd for $C_{19}H_{23}NO_4$ (percent): C, 69.28; H, 7.05; N, 4.26. Found (percent): C, 69.03; H, 7.02; N, 4.25.

The structure was proved by spectral data on the free base.

IR $\nu_{max.}^{CHCl_3}$ no band at 1625 cm$^{-1}$

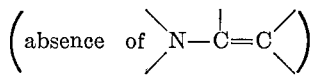

UV $\lambda_{max.}^{MeOH}$ 255 mμ (ε max. 9700); 209 mμ

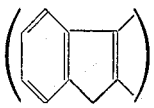

NMR($CDCl_3$) τ2.75 (4 protons-aromatic); τ6.75–7.6 (15 protons); no vinyl protons at τ4.75 p.p.m.

EXAMPLE 2

A medication was prepared including as an active ingredient a compound of this invention, 3-dimethylamino-1,2,3,4-tetrahydrofluorene, in an aqueous solution. This medication was administered in different doses to groups of 20 mice of both sexes which had been randomly selected. Each of four different doses was administered intraperitoneally to separate groups of 20 mice and each of three different doses was administered orally to separate groups of 20 mice. Analgesic activity in the test mice was determined substantially according to Haffner's artery clip method as described by Bianchi, C. and Franceschini, J. in "Experimental Observations on Haffner's Method for Testing Analgesic Drugs" Brit. J. Pharmacol. 9, 280 (1954). An analgesic $ED_{50}$ (median effective analgesic dose) of 4.9 mg./kg. was observed when the medication was administered intraperitoneally. An analgesic $ED_{50}$ of 34.2 mg./kg. was observed when the medication was administered orally. Analgesic activity was observed between 29.1 mg./kg. and 40.2 mg./kg.

EXAMPLE 3

Toxicity of this active ingredient was determined by administering this medication in graduated doses to separate groups of mice and observing their reaction. An $LD_{50}$ (dose at which there was 50% mortality) of 215 mg./kg. was observed when the medication was administered orally.

What is claimed is:

1. 3 - dimethylamino - 1,2,3,4 - tetrahydrofluorene and pharmacologically acceptable salts thereof.

References Cited

UNITED STATES PATENTS

| | | | |
|---|---|---|---|
| 2,413,598 | 12/1946 | Ballard et al. | 260—576X |
| 2,628,185 | 2/1953 | Lewenstein | 424—260 |
| 3,344,189 | 9/1967 | Davis | 260—576 |

CHARLES B. PARKER, Primary Examiner

C. F. WARREN, Assistant Examiner

U.S. Cl. X.R.

424—330